US011886673B2

United States Patent
Nayar et al.

(10) Patent No.: US 11,886,673 B2
(45) Date of Patent: *Jan. 30, 2024

(54) TRACKPAD ON BACK PORTION OF A DEVICE

(71) Applicant: Snap Inc., Santa Monica, CA (US)

(72) Inventors: Shree K. Nayar, New York, NY (US); Chang Xiao, New York, NY (US); Changxi Zheng, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,476

(22) Filed: Dec. 8, 2022

(65) Prior Publication Data

US 2023/0103517 A1 Apr. 6, 2023

Related U.S. Application Data

(63) Continuation of application No. 17/318,806, filed on May 12, 2021, now Pat. No. 11,550,435.

(Continued)

(51) Int. Cl.
*G06F 3/044* (2006.01)
*H04M 1/02* (2006.01)
(Continued)

(52) U.S. Cl.
CPC .............. *G06F 3/0443* (2019.05); *G06F 3/02* (2013.01); *G06F 3/0416* (2013.01);
(Continued)

(58) Field of Classification Search
None
See application file for complete search history.

(56) References Cited

U.S. PATENT DOCUMENTS

2010/0201647 A1* 8/2010 Verweg ................. G06F 3/0445
216/13
2012/0212445 A1* 8/2012 Heikkinen ............ G06F 1/1626
345/82
(Continued)

FOREIGN PATENT DOCUMENTS

EP 3171257 A1 5/2017
WO WO-2014111816 A2 7/2014
(Continued)

OTHER PUBLICATIONS

"U.S. Appl. No. 17/318,806, Advisory Action dated Jul. 13, 2022", 4 pgs.
(Continued)

*Primary Examiner* — Parul H Gupta
(74) *Attorney, Agent, or Firm* — Schwegman Lundberg & Woessner, P.A.

(57) ABSTRACT

Aspects of the present disclosure involve a system and a method for performing operations comprising: detecting physical touch of a touch-sensitive component on a back portion of a client device, the client device displaying a graphical user interface on a touch-sensitive display screen of a front portion of the client device; in response to detecting the physical touch, transmitting an electrical signal representing the physical touch of the touch-sensitive component on the back portion of the client device to the touch-sensitive display screen of the front portion of the client device; and causing an operation associated with the graphical user interface to be executed in response to the touch-sensitive display screen receiving the electrical signal representing the physical touch of the touch-sensitive component on the back portion of the client device.

20 Claims, 12 Drawing Sheets

Related U.S. Application Data

(60) Provisional application No. 63/024,696, filed on May 14, 2020.

(51) Int. Cl.
  *G06F 3/02* (2006.01)
  *G06F 3/041* (2006.01)
  *G06F 3/04883* (2022.01)

(52) U.S. Cl.
  CPC ........ *G06F 3/0446* (2019.05); *G06F 3/04883* (2013.01); *H04M 1/026* (2013.01)

(56) References Cited

U.S. PATENT DOCUMENTS

| | | | |
|---|---|---|---|
| 2015/0311940 A1* | 10/2015 | Lee | H04B 1/3888 455/575.8 |
| 2015/0363007 A1* | 12/2015 | Lysenko | G06F 3/0233 345/169 |
| 2016/0034738 A1* | 2/2016 | Luo | G06V 40/1376 382/125 |
| 2019/0310734 A1* | 10/2019 | Hotelling | G06F 3/0446 |
| 2021/0357075 A1 | 11/2021 | Nayar et al. | |

FOREIGN PATENT DOCUMENTS

| | | |
|---|---|---|
| WO | WO-2016199712 A1 | 12/2016 |
| WO | WO-2021231708 A1 | 11/2021 |

OTHER PUBLICATIONS

"U.S. Appl. No. 17/318,806, Final Office Action dated Apr. 21, 2022", 6 pgs.

"U.S. Appl. No. 17/318,806, Non Final Office Action dated Oct. 28, 2021", 17 pgs.

"U.S. Appl. No. 17/318,806, Notice of Allowance dated Sep. 8, 2022", 8 pgs.

"U.S. Appl. No. 17/318,806, Response filed Jan. 21, 2022 to Non Final Office Action dated Oct. 28, 2021", 10 pgs.

"U.S. Appl. No. 17/318,806, Response filed Jun. 21, 2022 to Final Office Action dated Apr. 21, 2022", 10 pgs.

"U.S. Appl. No. 17/318,806, Response filed Jul. 19, 2022 to Advisory Action dated Jul. 13, 2022", 9 pgs.

"International Application Serial No. PCT/US2021/032221, International Preliminary Report on Patentability dated Nov. 24, 2022", 10 pgs.

"International Application Serial No. PCT/US2021/032221, International Search Report dated Aug. 31, 2021", 4 pgs.

"International Application Serial No. PCT/US2021/032221, Written Opinion dated Aug. 31, 2021", 8 pgs.

\* cited by examiner

TRACKPAD ON BACK PORTION OF A DEVICE

CLAIM OF PRIORITY

This application is a continuation of U.S. application Ser. No. 17/318,806, filed on May 12, 2021, which claims the benefit of priority to U.S. Provisional Application Ser. No. 63/024,696, filed on May 14, 2020, which are incorporated herein by reference in their entirety.

TECHNICAL FIELD

The present disclosure relates generally to touchscreen navigation and operation of a user device.

BACKGROUND

Touchscreens are the primary way users operate mobile devices. The touchscreens allow a user to directly touch on a portion of a screen on which certain content is presented to control and interact with such content. For example, a user can be presented with a webpage on the touchscreen and swipe up/down to scroll the webpage and touch different portions to select different options presented on the webpage. Touchscreens also present keyboards with virtual keys a user can tap to compose messages and provide textual input to the mobile device. Using touchscreens devices can use the same component to output content (via a display) and receive physical input of commands from a user.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
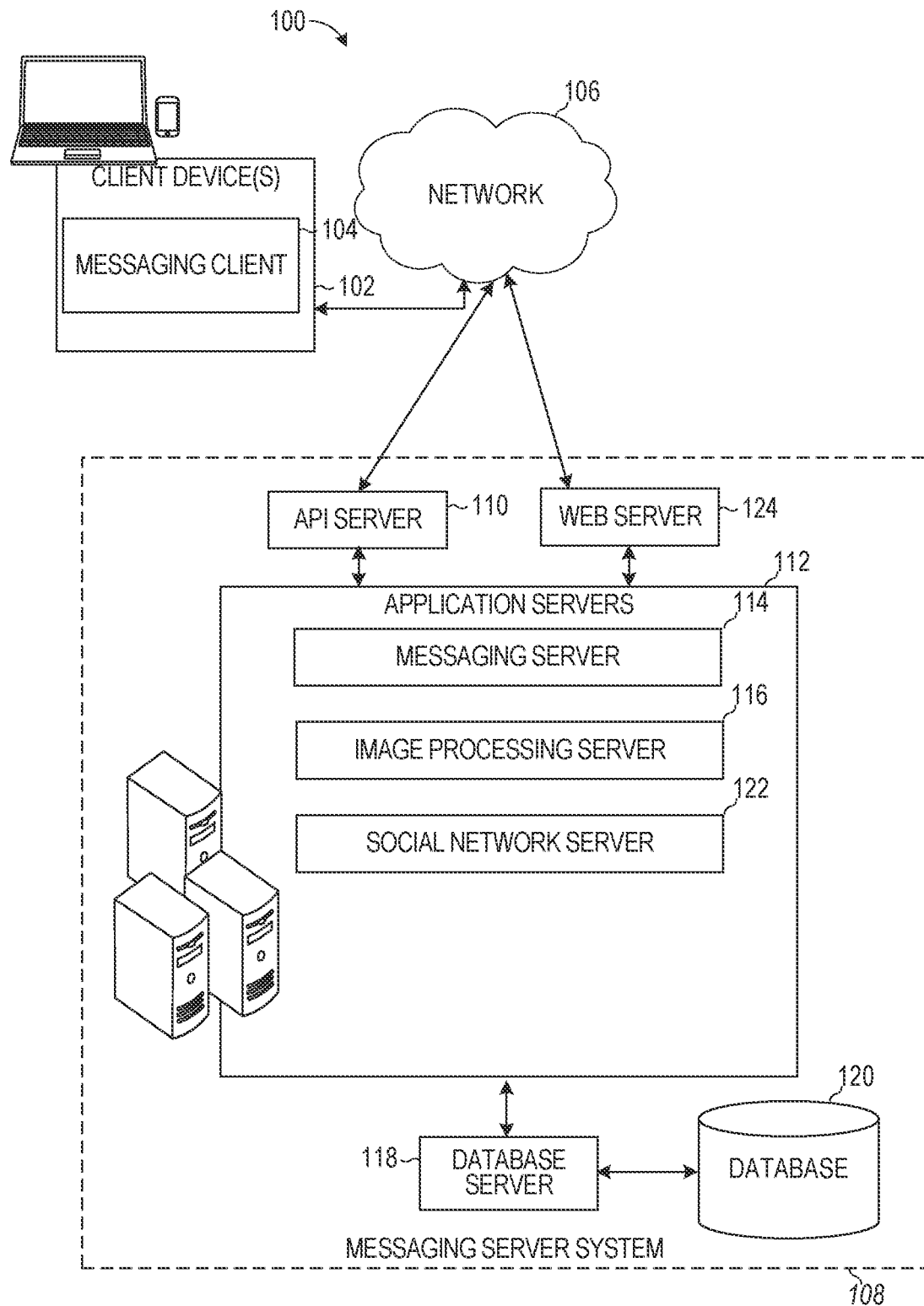
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Many typical devices operate using touchscreens. Such devices present content on the touchscreens and allow a user to input commands and interact with the devices by physically touching different portions of the touchscreen. These touchscreens are usually on the front part of the device (the part of the device facing the user). In order for a user to input commands to the devices using the touchscreen, the user has to place a finger on the touchscreen at a desired position. This ends up obstructing the view of the content that is displayed at the desired position and its surroundings. It is nearly impossible to interact with the touchscreen to input commands without at least partially obstructing view of the content presented on the touchscreen. This can interfere with the ability for the user to read content seamlessly and without interruption on the screen. In cases where video content is being played on the screen, the user can miss important portions of the content that is being displayed when the user tries to manipulate playback of the content by physically interacting with the touchscreen.

Also, interactions with the touchscreen are usually performed with a free hand of the user. For example, if the user is holding the device with the right hand, the user may use the left hand to interact with the touchscreen because it is too cumbersome and difficult to stretch the user's fingers on the right hand to reach desired positions on the touchscreen. Having the user operate the device with two hands makes it difficult for the user to multi-task and interact physically with other objects. Specifically, the user may have a difficult time holding a remote control to interact with a television while, at the same time, navigating content on a touchscreen device.

Some typical approaches connect peripheral input devices, such as remote controllers and touchpads, to the device being controlled. These peripheral devices allow the user to control or provide input to the device being controlled without using the touchscreen. Such peripheral devices, though, usually occupy additional space and consume other resources of the device being controlled. In addition, such peripheral devices either entirely disable the touchscreen of the device being controlled or can introduce conflicts with the touchscreen of the device being controlled, such as when an input is received by the touchscreen at the same time as an instruction is received from the peripheral device to operate the device being controlled. Also, such peripheral devices need to be connected to an input port (e.g., a USB port) of the device being controlled leaving the input port unusable for other purposes, such as connecting a power cord to charge the battery of the device being controlled. While these typical approaches generally work well for replacing how input is provided to the touchscreen devices with peripheral input devices, adding such peripheral devices introduces various complexities and is nontrivial. This is because such peripheral devices need to be electrically compatible with the touchscreen device being controlled, programmed or configured to communicate properly with the operating system or software running on the touchscreen device being controlled, and have a dedicated application running on the touchscreen device for communicating and interpreting commands from the peripheral device.

The disclosed embodiments improve the efficiency and ease of using an electronic touchscreen device by adding a touchpad component on the back of the touchscreen device that remotely and electrically controls the touchscreen portion on the front of the touchscreen device. The touchpad component can be placed on a back portion of the device facing away from the user, such as on the opposite side of the touchscreen facing the user. This way, the user can operate the touchscreen device with one hand while holding the device. For example, the user can interact with the touchpad component on the back of the device while viewing content on the touchscreen on the front of the device. This avoids obstructing the content being viewed while allowing the user to provide touch-based input to the device. As an example, the user can view a webpage on the front of the device through the touchscreen and can swipe a finger up/down on the touchpad on the back of the device to scroll the webpage up/down. Also, because the touchpad component electrically communicates with the touchscreen on the front of the device, input resources, such as a USB input port, do not need to be consumed. Additionally, because the input to the device still takes place ultimately through the touchscreen, the operating system does not need special handling of the touchpad component on the back and compatibility issues do not need to be considered.

In some embodiments, the touchpad component activates a certain combination of inputs on the touchscreen of the device, such as activating a top position of the touchscreen and a bottom position of the touchscreen simultaneously. These combination of inputs may be unique to inputs received from the touchpad component on the back of the device which enable the touchscreen to distinguish between inputs received directly by a user physically touching the touchscreen and indirectly by the user physically touching the touchpad component on the back of the device. In certain cases, the touchpad component on the back of the device can be selectively disabled/enabled by toggling or manipulating an analog or mechanical switch. Such a switch can be configured to disconnect logically or in an analog manner, the electrical signals from the touchpad component on the back of the device to the touchscreen on the front of the device. In this way, when the touchpad on the back of the device is disabled, the user cannot inadvertently or without intending to cause the touchscreen to be controlled by the touchpad component on the back of the device when the user is physically touching the touchpad component on the back of the device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108 includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems including, for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
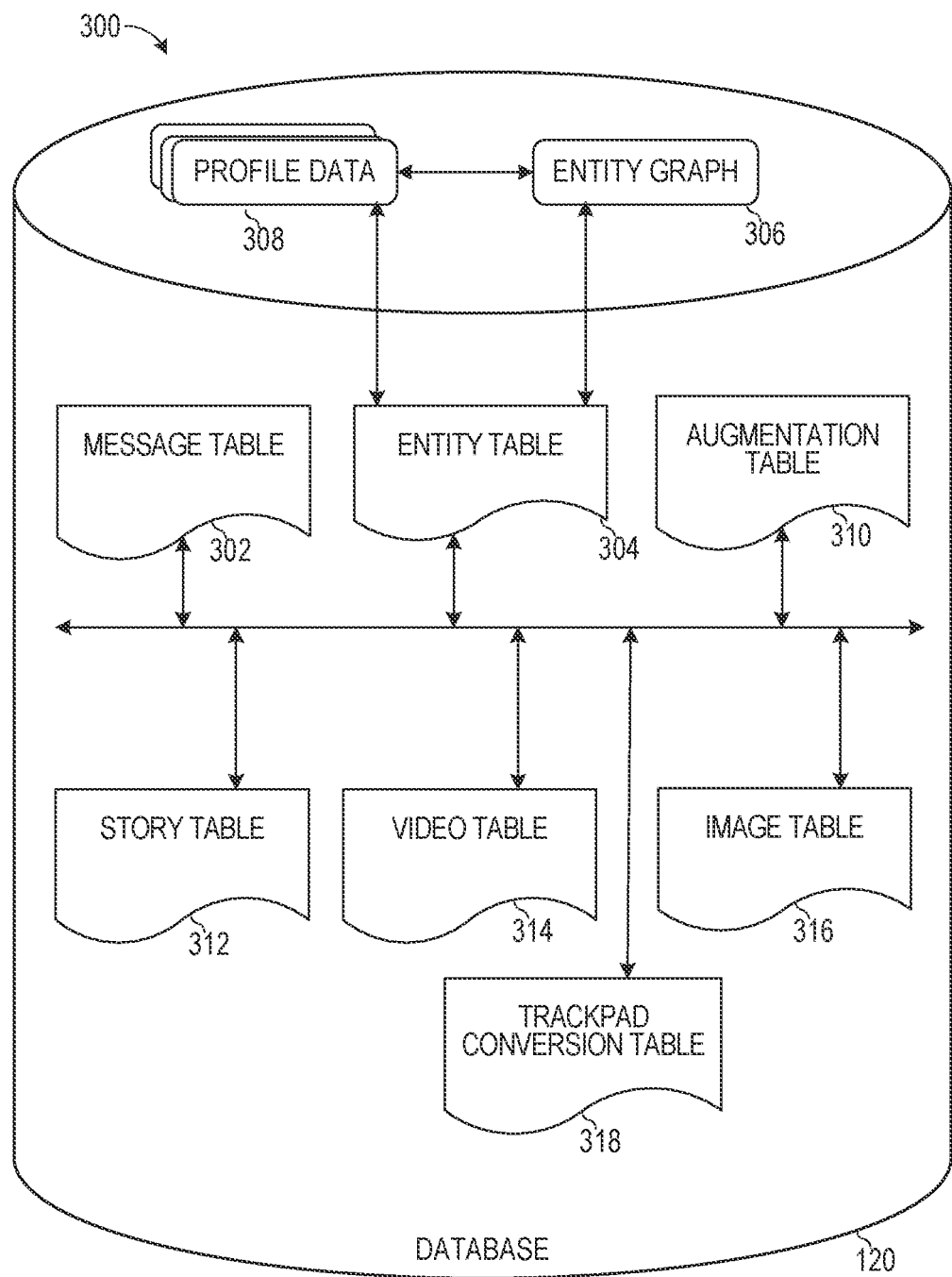
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
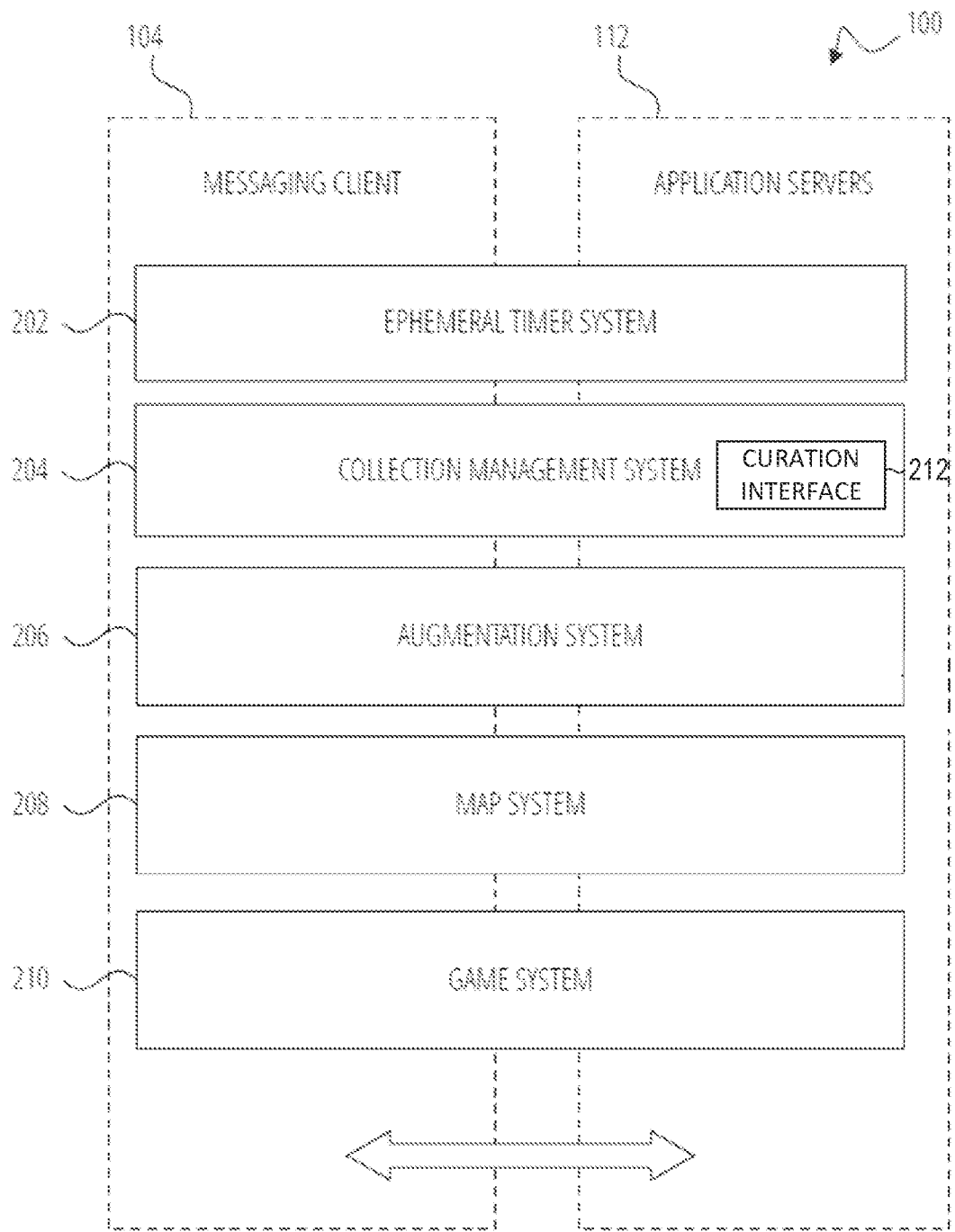
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client side by the messaging client 104 and on the sever side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The messaging client 104 receives inputs from a touchscreen of client device 102. The messaging client 104 determines whether the inputs from the touchscreen of the client device 102 correspond to interactions by a user with a touchpad component on the back of the device 102. For example, when multiple positions of the touchscreen are activated simultaneously and that correspond to a particular combination of simultaneously activated positions, the messaging client 104 determines that the touchscreen received inputs from the touchpad component on the back of the client device 102 rather than by direct physical touch to the touchscreen. In some embodiments, a user may toggle an on-screen option that is displayed by the operating system or messaging client 104 to instruct the operating system or messaging client 104 to interpret inputs on the touchscreen as being received from interactions with the touchpad on the back of the device 102.

When the messaging client 104 or operating system detects (by direct user instructions or by a unique activation of a combination of positions of the touchscreen of the client device 102) that a user is providing inputs to the touchscreen indirectly by interacting with the touchpad on the back of the client device 102, the messaging client 104 or operating system interprets the combination of inputs on the touchscreen to generate a command to control operation of the client device 102. For example, the messaging client 104 determines that one combination of the inputs on the touchscreen that is activated by the user interacting with the touchpad component on the back of the client device 102 corresponds to a scroll down operation. In such cases, the messaging client 104 scrolls the page being displayed on the touchscreen down. As another example, the messaging client 104 determines that a second combination of the inputs on the touchscreen that is activated by the user interacting with the touchpad component on the back of the client device 102 corresponds to a select operation. In such cases, the messaging client 104 instructs an application, such as a game, that is presenting the content on the touchscreen to perform a select operation.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any one particular message, at least message sender data, message recipient (or receiver) data, and a payload. Further details regarding information that may be included in a message, and included within the message data stored in the message table 302, is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location.

For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The trackpad conversion table 318 maps different combinations of positions of the touchscreen being activated to different operations. Specifically, the trackpad conversion table 318 maps combinations of positions of the touchscreen that are activated when a user physically touches a touchpad on the back of the client device 102 to various operations. For example, a first combination of positions of the touchscreen, such as a first position at the top of the touchscreen simultaneously activated with a first position at the bottom of the touchscreen, corresponds to a select operation. For example, a second combination of positions of the touchscreen, such as a second position at the top of the touchscreen simultaneously activated with a second position at the bottom of the touchscreen, corresponds to a scroll operation. Trackpad and touchpad are used interchangeably throughout this disclosure and may be understood to have the same functionality.

In some embodiments, the trackpad conversion table 318 may differ for different applications. For example, the trackpad conversion table 318 maps a first set of combinations of positions of the touchscreen being activated to a respective first set of operations when a user interface of a first application (e.g., a gaming application) is currently being presented on the touchscreen of the client device 102. In such cases, a first combination of positions of the touchscreen, such as a first position at the top of the touchscreen simultaneously activated with a first position at the bottom of the touchscreen, corresponds to a select operation. As another example, the trackpad conversion table 318 maps a second set of combinations of positions of the touchscreen being activated to a respective second set of operations when a user interface of a second application (e.g., a web-browsing application or messaging client 104) is currently being presented on the touchscreen of the client device 102. In such cases, the first combination of positions of the touchscreen, such as the first position at the top of the touchscreen simultaneously activated with the first position at the bottom of the touchscreen, corresponds to a scroll operation.

Data Communications Architecture

Figure 4:
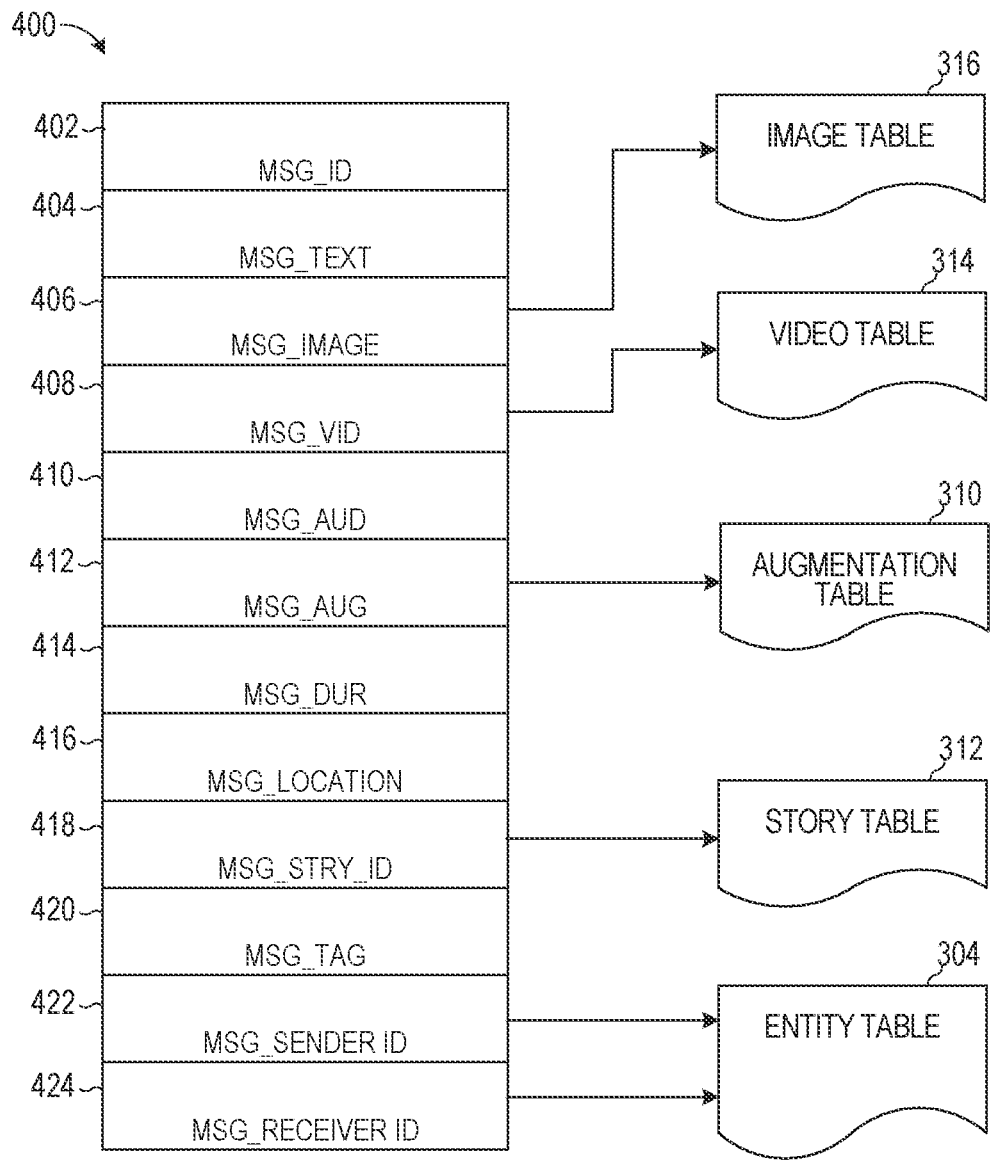
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5:
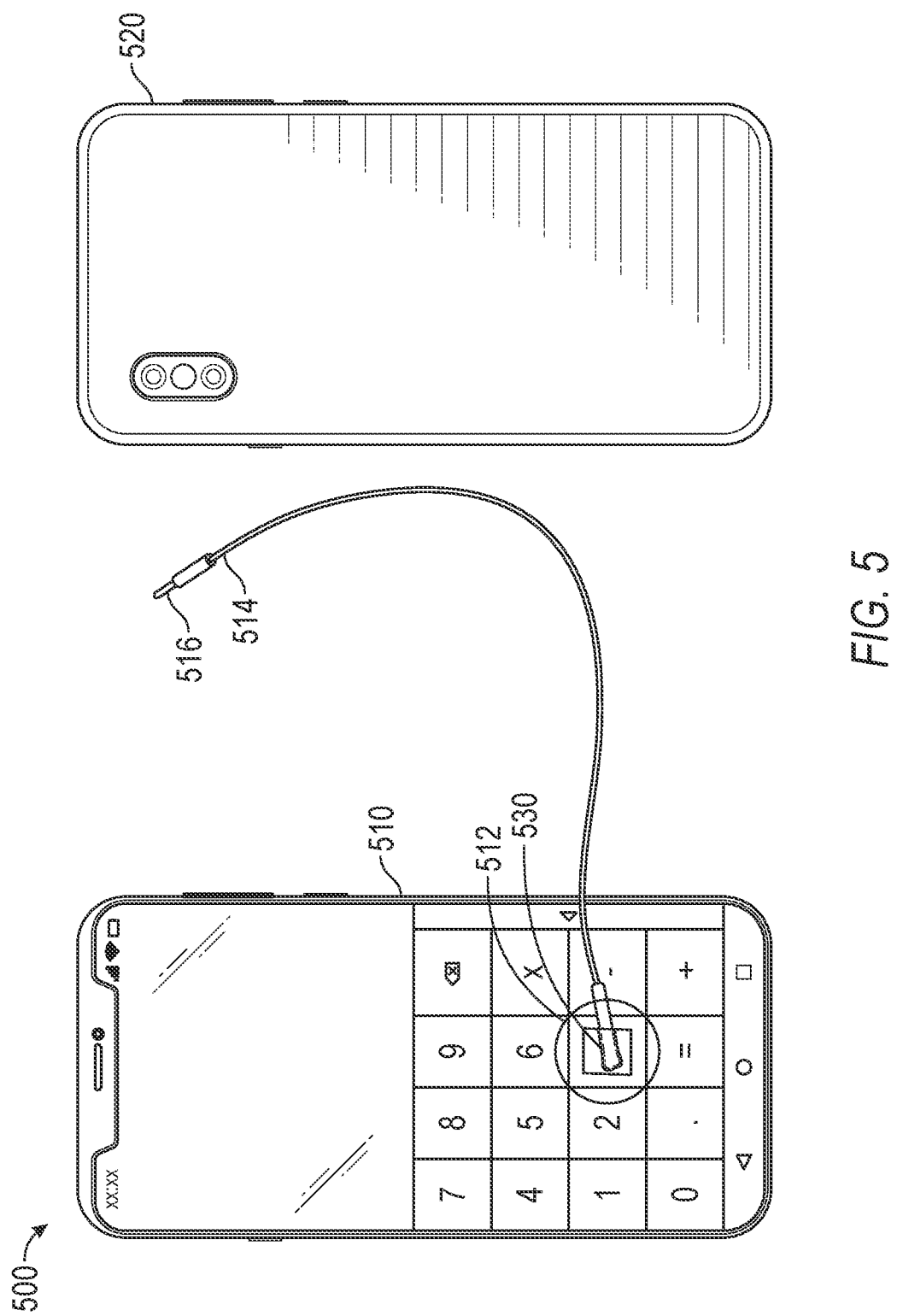
FIG. 5 is a diagrammatic representation of remote interaction with a touchscreen, in accordance with some examples.

FIG. 5 is a diagrammatic representation 500 of remote interaction with a touchscreen, in accordance with some examples. As shown in representation 500, a touchscreen device 510 is displaying a set of content on the screen, such as a keypad on a front of the device, such as client device 102. The touchscreen device 510 includes a back portion 520 which faces the opposite direction from the touchscreen on the front of the device. For example, a surface normal of the front of the touchscreen device 510 extends from the front of the device in a first direction and a surface normal of the back of the touchscreen device 510 extends from the back of the touchscreen device 510 in a second direction opposite the first direction. A user holds the touchscreen device 510 so that the front of the device is visible to and faces the user while the back of the device faces away from the user.

The touchscreen of the touchscreen device 510 includes a two-dimensional array or matrix of capacitors placed at individual positions on the entire visible space of the touchscreen. The touchscreen device 510 polls each capacitor in a suitable manner to detect change to a capacitance of one or more capacitors. As an example, when a user makes physical contact with a particular region of the touchscreen device 510 that includes one or more capacitors, the capacitance of the capacitors which are touched by the physical contact changes. The touchscreen device 510 detects changes to the capacitance of these capacitors which the user physically touches and, in response, determines that the region occupied by these capacitors was touched by the user. The touchscreen device 510 communicates the x and y coordinates of the region to a software application which then performs a particular operation or function. For example, if the number 6 of a keypad was displayed by the software application at the region which the touchscreen device 510 detected change to the capacitance, the software application may determine that the number 6 was selected. The software application performs a function or operation, such as adding the number 6 to a text string or calculator.

Another way to activate or change the capacitance value of the capacitors of the touchscreen is remotely without making physical contact between a user's finger and the designated region of the touchscreen that includes the capacitors. For example, a conductive wire or material is attached to the designated region 512 which includes the target capacitors. The conductive wire 514 extends a particular length (e.g., 20 centimeters) and has an end 516 which is also conductive. When the user physically touches the end 516 with the user's finger, the charge from the user's finger discharges or changes the capacitance of the capacitors in the designated region 512. This results in the touchscreen detecting touch of the capacitors in the designated region 512 without the user physically making contact with the capacitors in the designated region 512. In this way, the user can remotely activate different regions of the touchscreen of the touchscreen device 510 without actually touching capacitors in a given one of the regions.

According to the disclosed embodiments, a conductive material 530 is placed as a layer on top of one or more regions of the touchscreen of the touchscreen device 510. This conductive material 530 is electrically connected to respective regions of a touchpad on the back portion 520 of the touchscreen device 510. When a user makes physical contact with a given region of the touchpad on the back portion 520, an electrical signal is transmitted to the region of the touchscreen connected to the given region. This electrical signal activates or changes the capacitance of the capacitors associated with the region of the touchscreen and results in a particular operation of the software application to be performed.

In some embodiments, the conductive material 530 is placed over an entire portion or one or more segments of the touchscreen device 510. The conductive material 530 may be a conductive transparent material that comprises indium tin oxide (ITO). The conductive material may be partially transparent. The conductive material 530 may have a one-to-one correspondence between each capacitor of the touchscreen on the front portion of the touchscreen device 510 with each capacitor or touch sensor of the touchpad on the back portion 520 of the touchscreen device 510. In such cases, the conductive material 530 covers a two-dimensional array or grid of capacitors on the touchscreen on the front of the touchscreen device 510.

In some embodiments, the conductive material 530 is placed over a small region on the left, right, top, or bottom on the front of the touchscreen device 510. The conductive material 530, in such cases, only covers a one-dimensional array of capacitors of the touchscreen on the front portion of the touchscreen device 510. Namely, the conductive material 530 includes a one-dimensional array of conductive elements that are physically positioned over the one-dimensional array of capacitors. The conductive elements deliver an electric charge to the respective capacitors of the one-dimensional array of capacitors when a corresponding touch sensor of a trackpad on the back of the client device 102 is physically touched by a user. In some implementations, the trackpad on the back portion 520 of the touchscreen device 510 is also one-dimensional and has a one-to-one correspondence with the one-dimensional array of capacitors of the touchscreen on the front of the touchscreen device 510 via the conductive elements of the conductive material 530 placed over the one-dimensional array of capacitors of the touchscreen.

Figure 6:
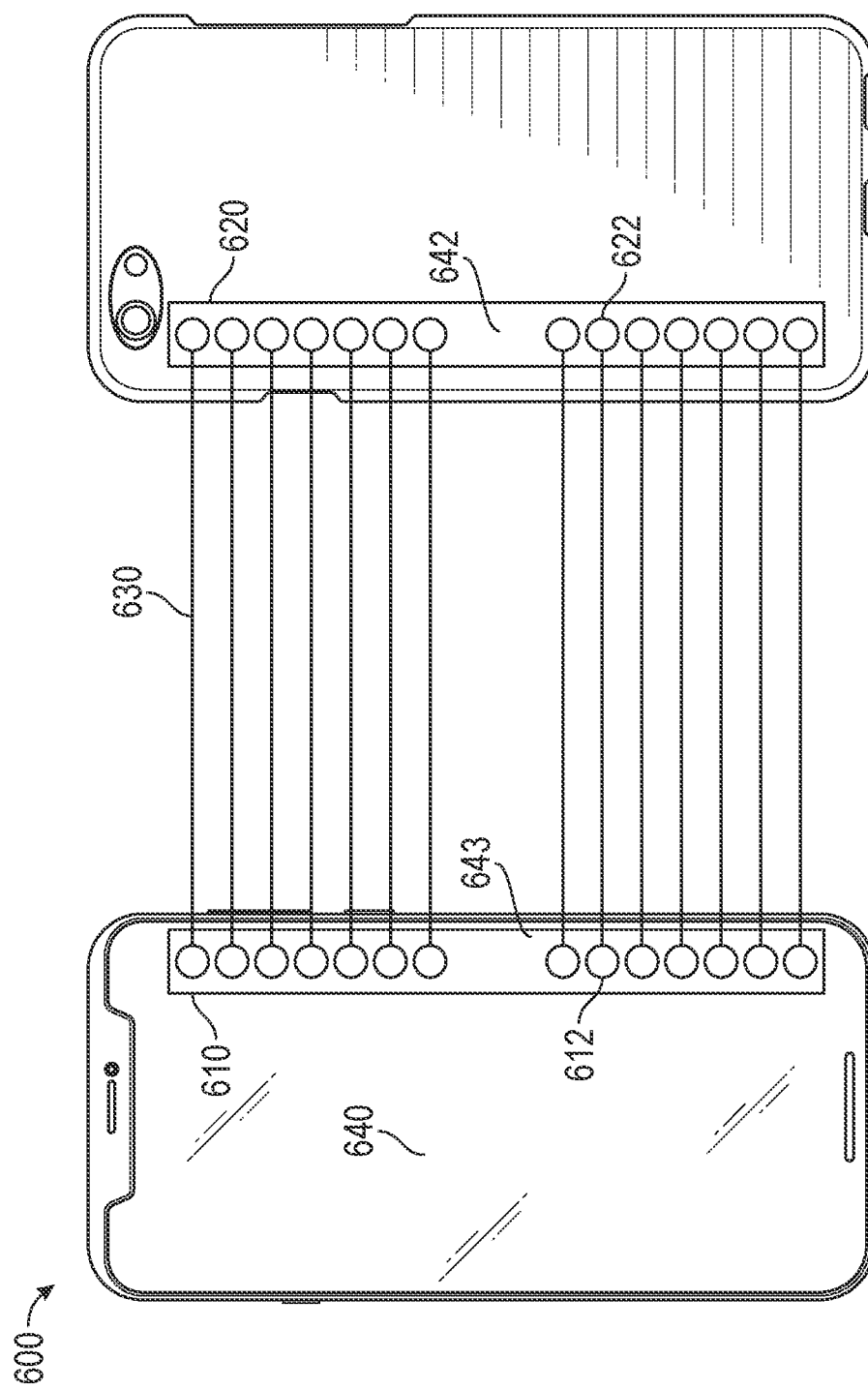
FIGS. 6-9 are diagrammatic representations of various embodiments of a client device with a trackpad on the back of the client device, in accordance with some examples.

FIG. 6 is a diagrammatic representation 600 of an embodiment of the client device 102 with a trackpad on the back of the client device, in accordance with some examples. As shown in representation 600, on the left is the front portion of the client device 102 that includes the touchscreen 640 covered, at least in party by the conductive material 643, and on the right is the back portion of the client device 102 that includes the trackpad 642. A one-to-one correspondence is shown between the one-dimensional array of capacitors 610 of the touchscreen on the front of the client device 102 via the conductive elements of the conductive material 643 and the one-dimensional array of touch sensors 620 on the back of the client device 102. An electrical connection 630, such as using a metal or conductive wire 514, is formed between each touch sensor of the touchpad on the back of the client device 102 and a respective capacitor in the one-dimensional array of capacitors 610 on the front of the device via the conductive elements of the conductive material 643. In such cases, when a user physically touches a first touch sensor 622 on the back of the client device 102, an electrical signal is sent to the electrically coupled corresponding capacitor 612 of the touchscreen 640 on the front of the client device 102 via the corresponding conductive element of the conductive material 643 that overlays the corresponding capacitor. The application running on the client device 102 that displays content on the touchscreen can perform an operation associated with receiving a touch input of the capacitor 612. In one example, a user can swipe a finger down a column of sensors of the one-dimensional array of touch sensors 620 on the back of the client device 102 which respectively activates respective capacitors on the touchscreen 640 on the front of the device. This gesture is interpreted as a swipe down operation which may cause the application running on the client device 102 to scroll down or up content being displayed on the touchscreen 640.

In some implementations, the trackpad 642 on the back portion 520 of the touchscreen device 510 is two-dimensional and has a many-to-one correspondence with the one-dimensional array of capacitors of the touchscreen on the front of the touchscreen device 510. In such circumstances, a first set of multiple touch sensors on the trackpad 642 on the back portion 520 is connected electrically to a first capacitor on the front portion of the touchscreen device 510 and a second set of multiple touch sensors on the trackpad 642 on the back portion 520 is connected electrically to a second capacitor on the front portion of the touchscreen device 510.

Figure 7:
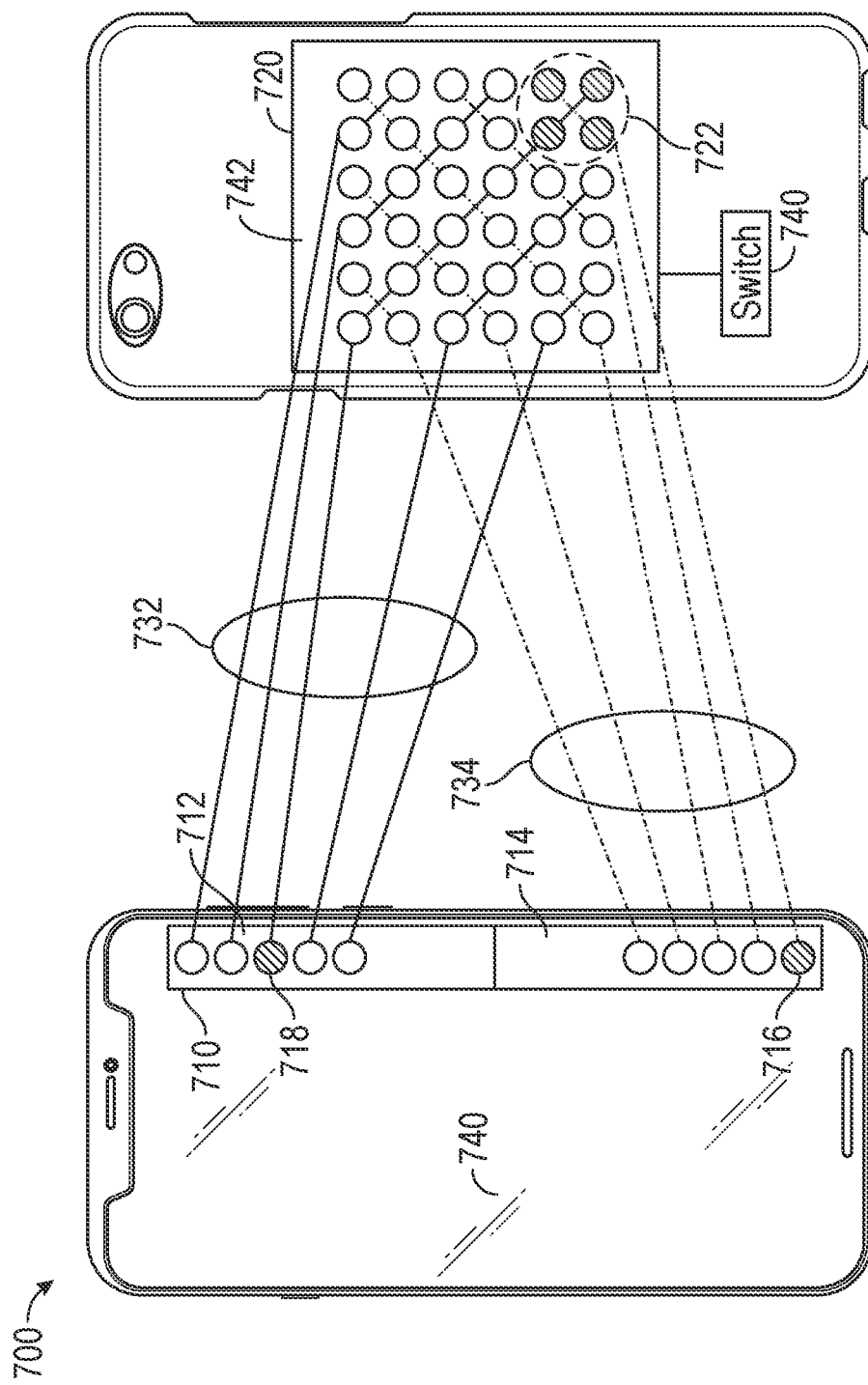

FIG. 7 is a diagrammatic representation 700 of an embodiment of the client device 102 with a trackpad 742 on the back of the client device, in accordance with some examples. As shown in representation 700, on the left is the front portion of the client device 102 that includes the touchscreen 740 covered, at least in part, by the conductive material 643, and on the right is the back portion 520 of the client device 102 that includes the trackpad 742. A many-to-one correspondence is shown between the one-dimensional array of capacitors 710 of the touchscreen on the front of the client device 102 and the two-dimensional array or matrix of touch sensors 720 on the back of the client device 102 via the conductive elements of the conductive material 643. A first set of electrical connections 732, such as using one or more metal or conductive wires 514, is formed between a first set of touch sensors of the touchpad on the back of the client device 102 and a respective capacitor 612 in a first portion 712 (e.g., a top portion) of the one-dimensional array of capacitors 710 on the front of the device via the conductive material 643. A second set of electrical connections 734, such as using one or more metal or conductive wires 514, is formed between a second set of touch sensors of the touchpad on the back of the client device 102 and a respective capacitor 612 in a second portion 714 (e.g., bottom portion) of the one-dimensional array of capacitors 710 on the front of the device via the conductive material 643.

In such cases, when a user physically touches a first collection of sensors 722 on the back of the client device 102, an electrical signal is sent to the electrically coupled corresponding capacitors 718 and 716 of the touchscreen on the front of the client device 102 through or via the conductive material 643 that is placed on top of the capacitors 718 and 716. For example, while the user touches four sensors on the touchpad on the back of the client device 102, only two capacitors (e.g., less capacitors than the number of sensors that are touched), one from the first portion 712 and one from the second portion 714, of the capacitors on the front of the client device 102 are discharged or activated or have their charges changed. The application running on the client device 102 that displays content on the touchscreen 740 can perform an operation associated with receiving a touch input of the combination of capacitors 718 and 716.

In some embodiments, a switch 740, such as a mechanical, digital or analog switch is provided on the client device 102. The switch 740 may be placed on the front portion of the client device 102, on the back portion of the client device 102, or along one of the edges or sides of the client device 102. The switch 740 may be a push button or toggle button. The switch 740 may operatively disconnect the electrical coupling between the trackpad on the back of the client device 102 from the conductive layer on the front of the client device 102. This allows a user to selectively activate or deactivate controlling the touchscreen 740 of the client device 102 on the front of the client device 102 using the touchpad on the back of the device. For example, when the switch 740 is in the engaged or active state, the electrical connections are formed between the trackpad 742 on the back of the client device 102 and the conductive layer 643 on the front of the client device 102. In such cases, when the user touches a given one or more touch sensors 720 of the trackpad 742 on the back of the device, a corresponding one or more capacitors of the touchscreen 740 on the front of the client device 102 are discharged, activated or have their charges change. This is due to an electrical signal that is allowed to be transmitted from the touch sensors 720 that are touched to the corresponding conductive elements of the conductive material 643 which then discharges or changes the charge of the capacitor 612 overlaid by the conductive element. For example, when the switch 740 is in the disengaged or inactive state, the electrical connections are removed or disconnected between the trackpad 742 on the back of the client device 102 and the conductive layer 643 on the front of the client device 102. In such cases, when the user touches a given one or more touch sensors 720 of the trackpad 742 on the back of the device 102, a corresponding one or more capacitors of the touchscreen 740 on the front of the client device 102 are not impacted or not discharged.

In some cases, the switch 740 includes A input, B output, a power input and a control signal input. The A input receives respective signals from touch sensors 720 of the touchpad on the back of the client device 102 and delivers the respective signals to a respective B output to a corresponding conductive element of the conductive layer 643 on the front of the client device 102. The control signal input enables or disables the delivery of the electrical signal from the A input to the B output. When the switch 740 is in the disabled state, the control signal prevents the A input from delivering signals to the B output. When the switch 740 is in the enabled, state, the A input delivers signals to the B output based on which touch sensors 720 of the trackpad 742 on the back of the client device 102 are physically touched by a user.

Figure 8:
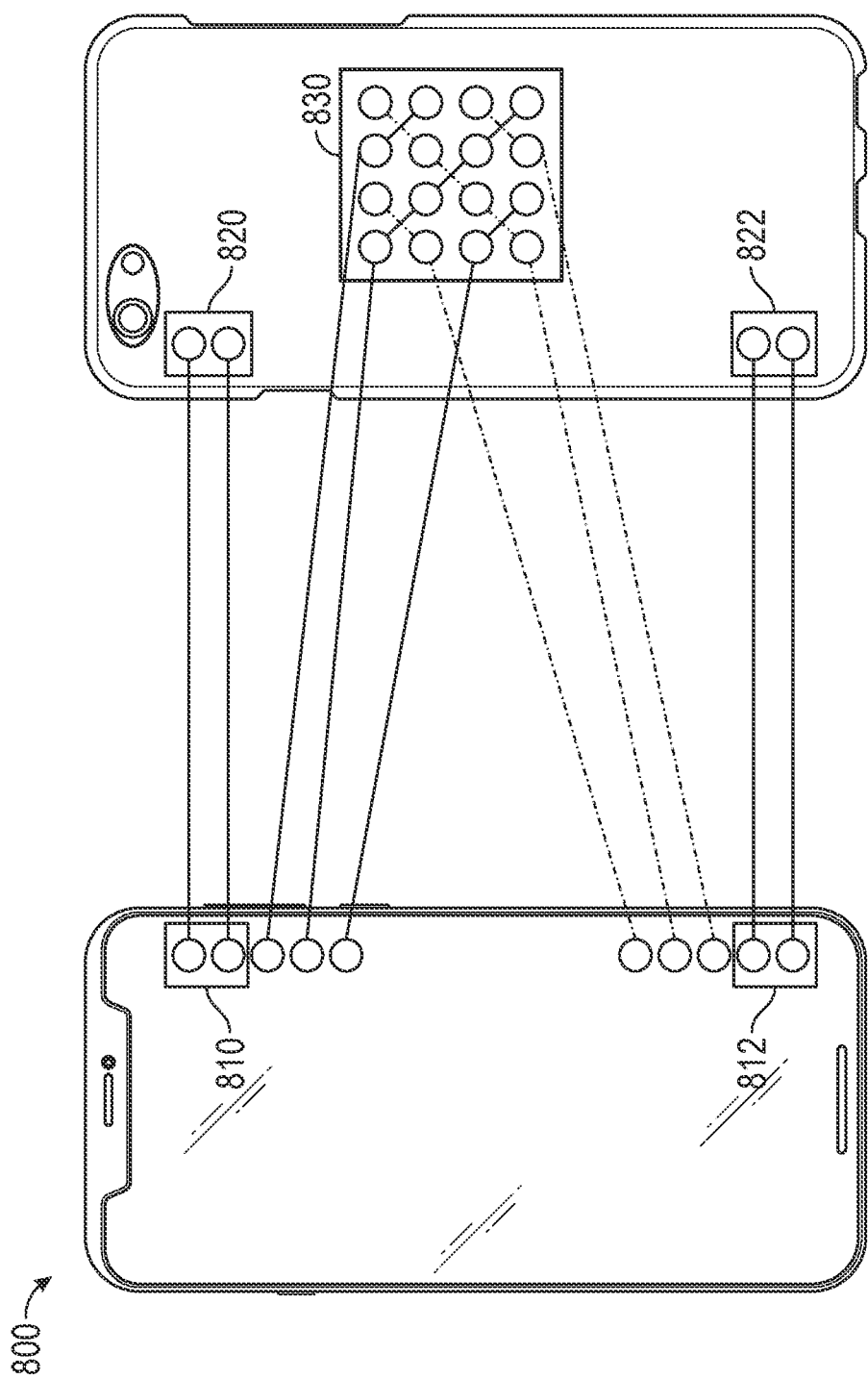

FIG. 8 is a diagrammatic representation 800 of an embodiment of the client device 102 with a trackpad on the back of the client device, in accordance with some examples. Representation 800 shows a combination of the embodiments shown in FIGS. 6 and 7. The representation 800 shown in FIG. 8 may be suitable for a gaming application. The trackpad on the back of the client device 102 includes a first pair of controllers 820 and 822 that each includes a respective set of touch sensors 720. These touch sensors 720 are coupled electrically directly to respective conductive elements of the conductive material 810 and 812 in a one-to-one correspondence, similar to that shown in FIG. 6. The conductive elements activate respective touchscreen capacitors at respective positions. The trackpad on the back of the client device 102 includes a two-dimensional grid 830 of touch sensors 720. These sensors are coupled in a many-to-one arrangement (similar to that shown in FIG. 7), such that a particular group of touch sensors 720 is coupled electrically directly to one particular conductive element of the conductive material. The two-dimensional grid 830 of touch sensors is configured to simultaneously activate a given pair of touchscreen capacitors at different positions (e.g., at the top and at the bottom of the client device 102) when a group of touch sensors 720 are physically touched by a user.

Figure 9:
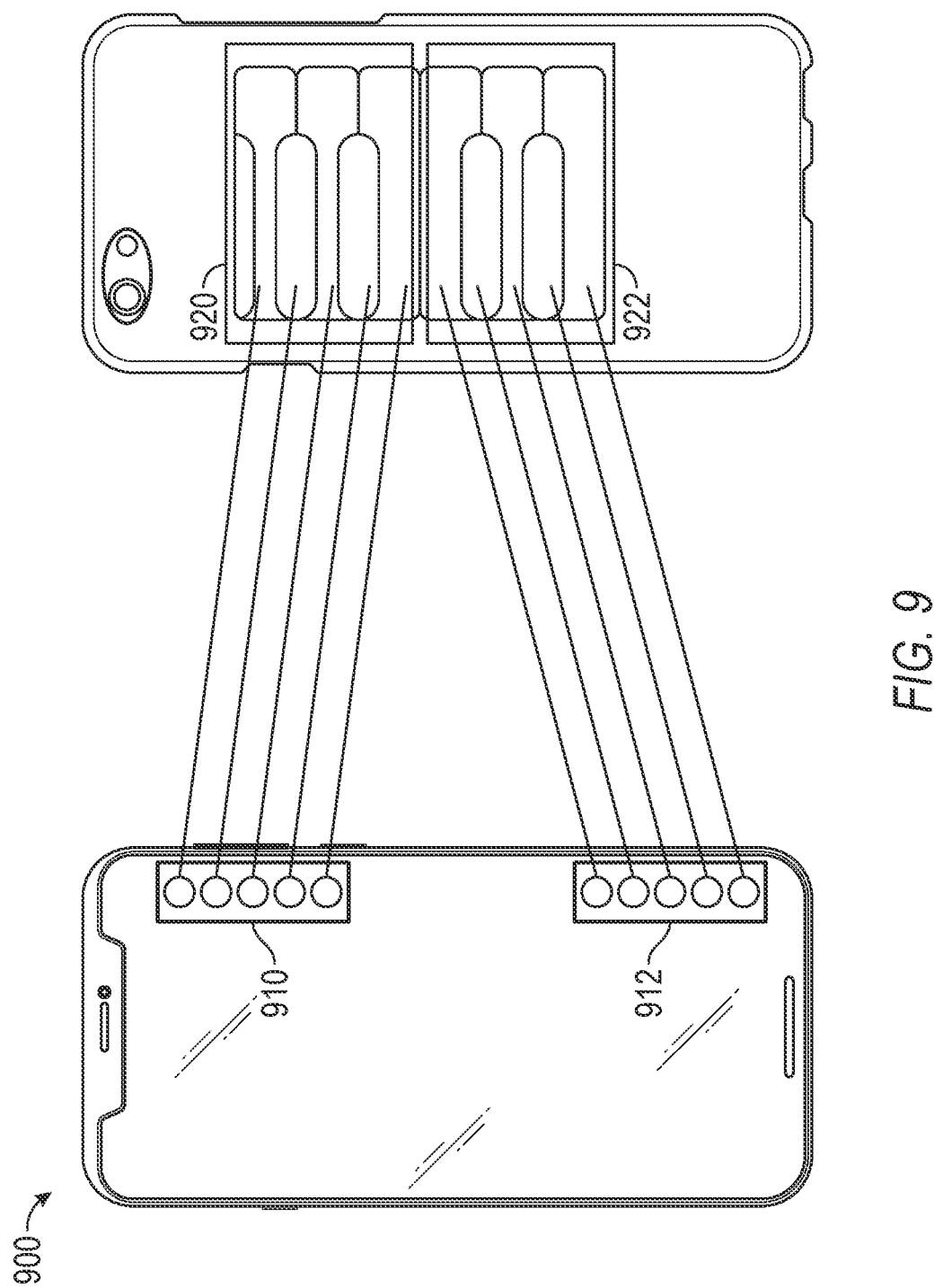

FIG. 9 is a diagrammatic representation 900 of an embodiment of the client device 102 with a trackpad on the back of the client device, in accordance with some examples. Representation 900 shows another implementation of the embodiment shown in FIG. 6. The representation 900 shown in FIG. 9 may be suitable for a music application. For example, the touch sensors 720 of the touchpad on the back of the client device 102 are arranged similar to the way in which keys of a musical instrument are arranged (e.g., piano keys). The touchpad can have a physical appearance to resemble the keys of the musical instrument. Each touch sensor of a first portion 920 of the touchpad can be directly electrically coupled to in a one-to-one correspondence to a corresponding first portion 910 of the conductive material 810 on the front of the client device 102 that contains a first set of conductive elements. Each conductive element of the first set of conductive elements is configured to deliver an electrical signal to a respective touchscreen capacitor 612 at a particular position. Each touch sensor of a second portion 922 of the touchpad can be directly electrically coupled to in a one-to-one correspondence to a corresponding second portion 912 of the conductive material 810 on the front of the client device 102 that contains a second set of conductive elements. Each conductive element of the second set of conductive elements is configured to deliver an electrical signal to a respective touchscreen capacitor 612 at a particular position. Although piano keys are shown and described any other suitable musical instrument keys and arrangement of such keys can be similarly provided by the touchpad on the back of the client device 102, such as a harp, a trumpet, and so forth.

As discussed above, the trackpad on the back of the client device 102 can take many different patterns. Various patterns are discussed above in connection with FIGS. 6-9. The pattern for a particular trackpad on the back of the client device 102 can be changed manually by a user changing a physical tangible module that includes the conductive material 810 that overlays the touchscreen on the front of the device and that includes the trackpad on the back of the client device 102. The user can purchase or access various modules that each contain a different pattern for the trackpad on the back of the client device 102 and can swap out the modules by inserting the client device 102 into the module that is desired in the form of a sleeve or cover. The pattern of the touch sensors 720 of the touchpad or trackpad may include a square grid, a circular grid or a plurality of individual shapes or different shapes.

In some implementations, the conductive material 810 that overlays the touchscreen on the front of the device and that includes the trackpad on the back of the client device 102 can have an electronically selected pattern of conductive elements on the front of the device and touch sensors 720 on the trackpad on the back of the client device 102. A user can select a particular pattern by setting a particular physical switch 740 or by sending a communication to the module that contains the conductive material 810 and trackpad on the back of the client device 102. For example, the user can communicate with the module that contains the conductive material 810 and trackpad via wireless communication, such as Bluetooth or WiFi. In some cases, the client device 102 can transmit a communication electronically by wireless to the module that contains the conductive material 810 and trackpad with instructions on the type of pattern for the conductive elements and the touch sensors on the trackpad. In one instance, the trackpad and the conductive elements of the conductive material 810 can take the form shown in FIG. 7 and in response to receiving a communication from an external device, such as client device 102, the module can change to take a different form, such as the form shown in FIG. 8.

Figure 10:
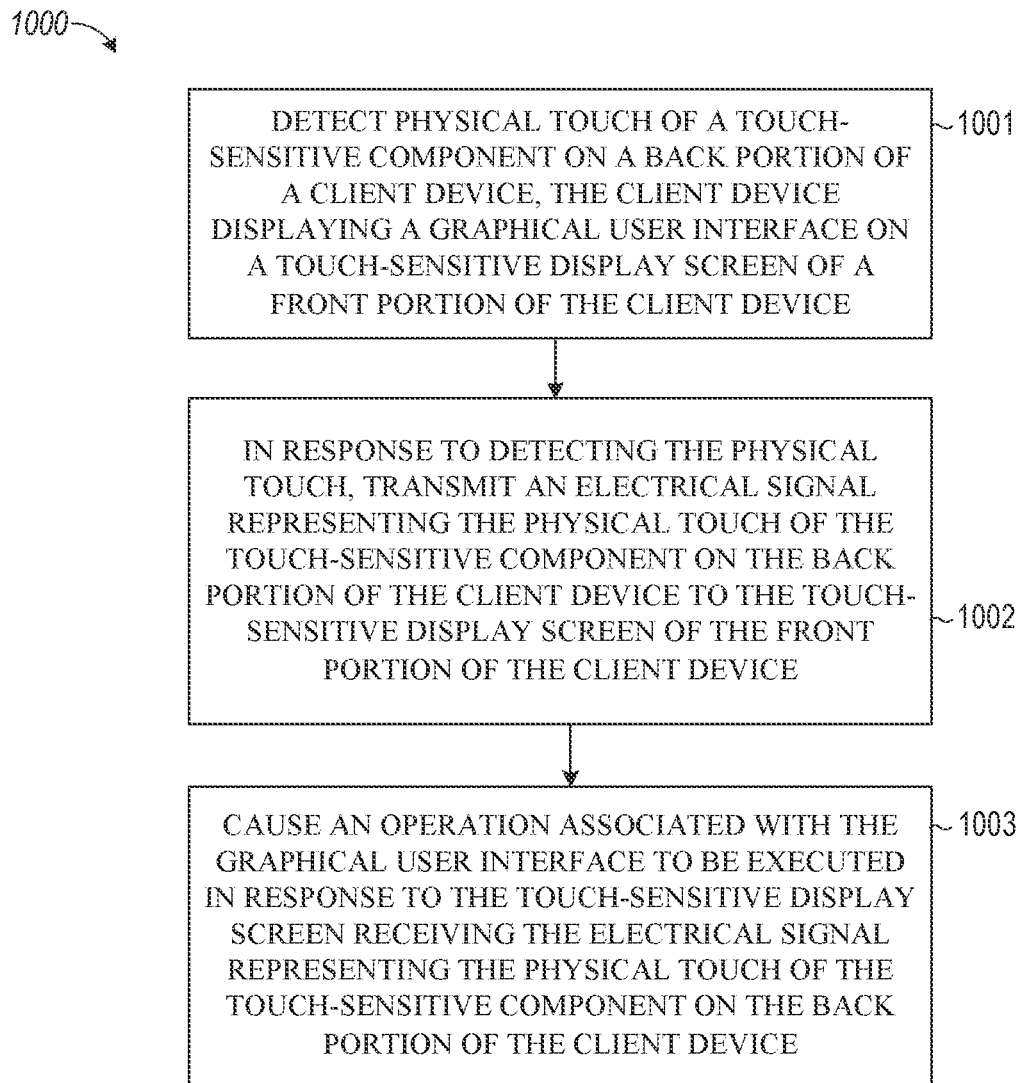
FIG. 10 is a flowchart illustrating example operations of the client device with a trackpad on the back of the client device, according to example embodiments.

FIG. 10 is a flowchart illustrating example operations of the trackpad on back of device system in performing process 1000, according to example embodiments. The process 1000 may be embodied in computer-readable instructions for execution by one or more processors such that the operations of the process 1000 may be performed in part or in whole by the functional components of the client device 102; accordingly, the process 1000 is described below by way of example with reference thereto. However, in other embodiments at least some of the operations of the process 1000 may be deployed on various other hardware configurations. The operations in the process 1000 can be performed in any order, in parallel, or may be entirely skipped and omitted At operation 1001, the client device 102, displaying a graphical user interface on a touch-sensitive display screen of a front portion of the client device, detects physical touch of a touch-sensitive component on a back portion 520 of a client device. For example, as shown in representation 700, on the left is the front portion of the client device 102 that includes the touchscreen covered, at least in part, by the conductive material 810, and on the right is the back portion 520 of the client device 102 that includes the trackpad (e.g., touch-sensitive component). The touchscreen may present a graphical user interface, such as a webpage of a particular application, such as a browser application. The trackpad on the back of the client device 102 includes a two-dimensional array or matrix of touch sensors 720 that detect physical touch by a user. For example, the touch sensors 720 include capacitors and when one or a group of capacitors change charge, the trackpad determines that a position associated with the group of capacitors has been physically touched by a user.

In response to detecting the physical touch, the client device 102 transmits an electrical signal representing the physical touch of the touch-sensitive component on the back portion 520 of the client device to the touch-sensitive display screen of the front portion of the client device, at operation 1002. For example, a first set of electrical connections 732, such as using one or more metal or conductive wires 514, is formed between a first set of touch sensors of the touchpad on the back of the client device 102 and a respective capacitor 612 in a first portion 712 (e.g., a top portion) of the one-dimensional array of capacitors 710 on the front of the device via the conductive material 810. When a user physically touches a first collection of sensors 722 on the back of the client device 102, an electrical signal is sent to the electrically coupled corresponding capacitors 718 and 716 of the touchscreen on the front of the client device 102 through or via the conductive material 810 that is placed on top of the capacitors 718 and 716.

At operation 1003, the client device 102 causes an operation associated with the graphical user interface to be executed in response to the touch-sensitive display screen receiving the electrical signal representing the physical touch of the touch-sensitive component on the back portion 520 of the client device 102. For example, an application running on the client device 102 that displays content on the touchscreen can perform an operation associated with receiving a touch input of the combination of capacitors 718 and 716, such as scrolling the display up/down when the touchpad detects touch input that drags a finger or swipes a finger up/down.

Machine Architecture

Figure 11:
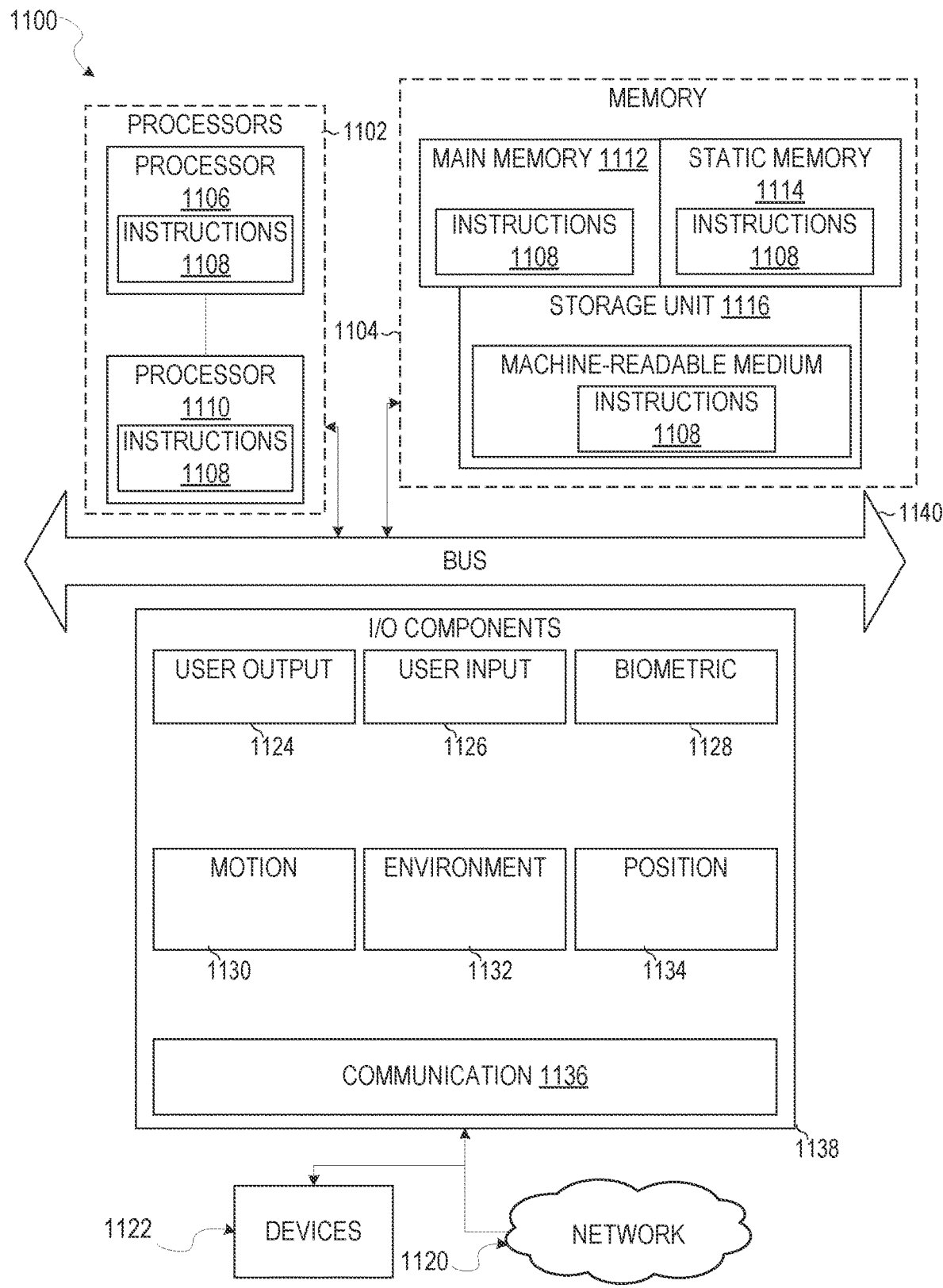
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1106 and a processor 1110 that execute the instructions 1108. The term "processor" is intended to include multi-core processors 1102 that may comprise two or more independent processors 1106, 1110 (sometimes referred to as "cores") that may execute instructions 1108 contemporaneously. Although FIG. 11 shows multiple processors 1102, the machine 1100 may include a single processor 1106 with a single core, a single processor 1106 with multiple cores (e.g., a multi-core processor), multiple processors 1102 with a single core, multiple processors 1102 with multiples cores, or any combination thereof.

The memory 1104 includes a main memory 1112, a static memory 1114, and a storage unit 1116, all accessible to the processors 1102 via the bus 1140. The main memory 1112, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple camera systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory 1104 of the processors 1102) and storage unit 1116 may store one or more sets of instructions 1108 and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
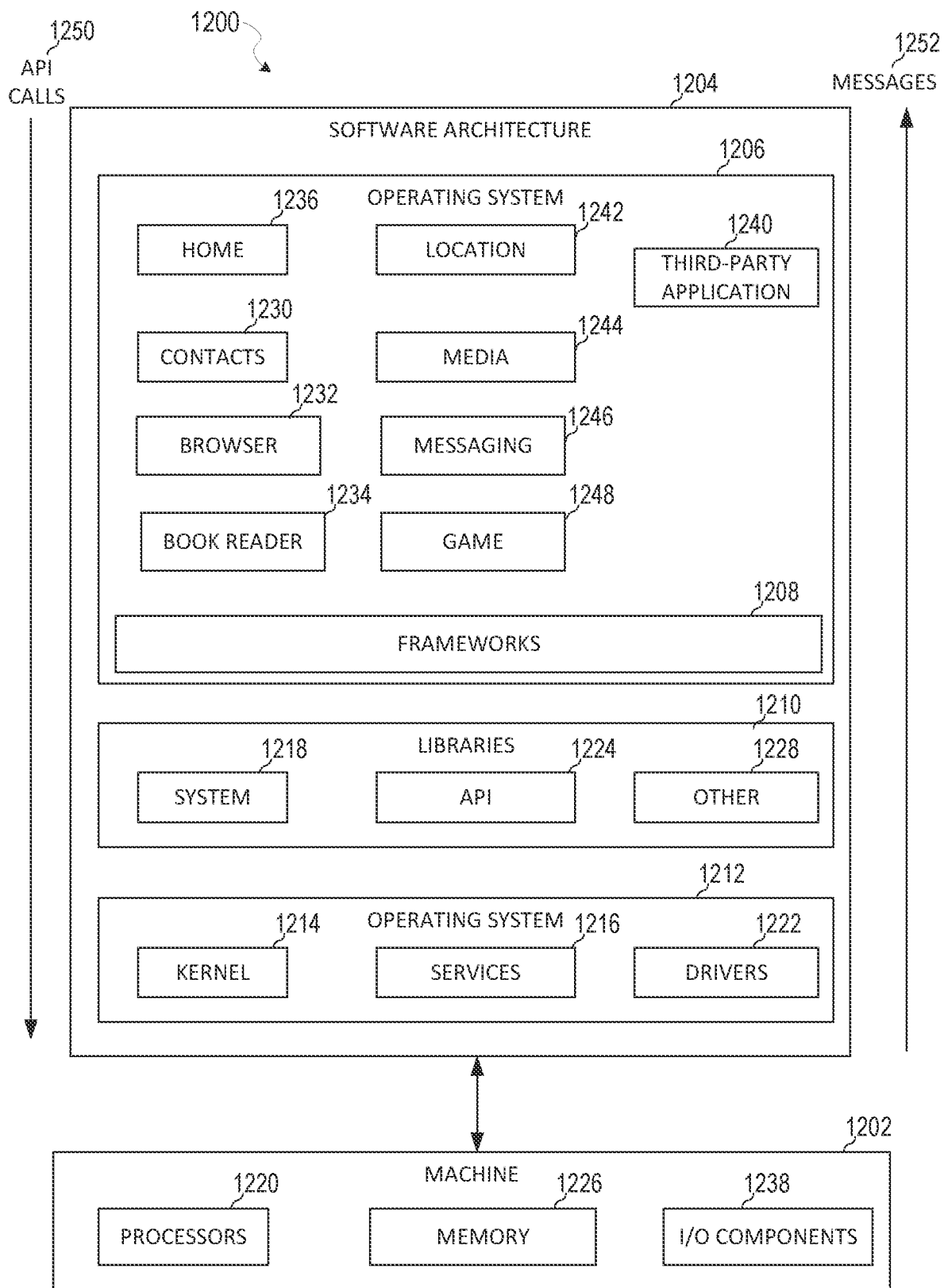
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system 1212 or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    storing a many-to-one correspondence between a first plurality of touch sensors of a touch sensitive component on a back portion of a client device and a first capacitor on a touch-sensitive display screen of a front portion of the client device; and
    in response to detecting simultaneous physical touch of the first plurality of touch sensors, transmitting an electrical signal representing the simultaneous physical touch to the first capacitor, the first capacitor comprising a conductive element of a plurality of conductive elements associated with the touch-sensitive display screen of the front portion of the client device.

2. The method of claim 1, wherein the client device displays a graphical user interface on the touch-sensitive display screen of the front portion of the client device, further comprising:
- causing an operation associated with the graphical user interface to be executed in response to the touch-sensitive display screen receiving the electrical signal representing the simultaneous physical touch of the first plurality of touch sensors of the touch-sensitive component on the back portion of the client device.

3. The method of claim 1, wherein the touch-sensitive component on the back portion of the client device is electrically coupled to the touch-sensitive display screen of the front portion of the client device, wherein a first group of multiple touch sensors on the touch-sensitive component on the back portion of the client device is associated with a first conductive element of the touch-sensitive display screen, and wherein a second group of multiple touch sensors on the touch-sensitive component on the back portion of the client device is associated with a second conductive element of the touch-sensitive display screen.

4. The method of claim 1, further comprising scrolling a display of a web browser in a direction corresponding to a swipe gesture.

5. The method of claim 1, wherein the touch-sensitive display screen of the front portion of the client device comprises a transparent layer overlaying at least a portion of the touch-sensitive display screen, the transparent layer comprising a two-dimensional array of conductors.

6. The method of claim 5, wherein the transparent layer comprises conductive material.

7. The method of claim 5, wherein the touch-sensitive component comprises a plurality of touch sensors.

8. The method of claim 1, further comprising toggling a physical switch to operatively and selectively disconnect electric coupling between the touch-sensitive component and the touch-sensitive display screen, wherein when the physical switch is in an inactive state, physical touch of a given touch sensor of the touch-sensitive component does not cause a corresponding capacitor of the touch-sensitive display screen to be discharged.

9. The method of claim 1, further comprising toggling a physical switch to modify a pattern of the touch-sensitive display screen associated with the touch-sensitive component.

10. The method of claim 9, further comprising:
- setting the physical switch to activate a first pattern in which a first touch sensor of the touch-sensitive component is electrically coupled to a first portion of the touch-sensitive display screen; and
- toggling the physical switch to activate a second pattern in which the first touch sensor of the touch-sensitive component is electrically coupled to a second portion of the touch-sensitive display screen.

11. The method of claim 10, wherein the first pattern corresponds to an arrangement of keys of a musical instrument or game controller.

12. The method of claim 1, further comprising activating and deactivating the touch-sensitive component by manipulating an analog switch.

13. The method of claim 12, wherein the analog switch comprises a push button or a toggle button.

14. The method of claim 1, wherein the touch-sensitive component comprises a first touch-sensitive component with a first arrangement of touch sensors, and wherein a second touch-sensitive component is configured to replace the first touch-sensitive component, the second touch-sensitive component comprising a second arrangement of touch sensors.

15. The method of claim 1, wherein the touch-sensitive display screen of the front portion of the client device comprises a transparent layer overlaying at least a portion of the touch-sensitive display screen, the transparent layer comprising indium tin oxide (ITO).

16. A system comprising:
- a processor configured to perform operations comprising:
  - storing a many-to-one correspondence between a first plurality of touch sensors of a touch sensitive component on a back portion of a client device and a first capacitor on a touch-sensitive display screen of a front portion of the client device; and
  - in response to detecting simultaneous physical touch of the first plurality of touch sensors, transmitting an electrical signal representing the simultaneous physical touch to the first capacitor, the first capacitor comprising a conductive element of a plurality of conductive elements associated with the touch-sensitive display screen of the front portion of the client device.

17. The system of claim 16, wherein the client device displays a graphical user interface on the touch-sensitive display screen of the front portion of the client device, the operations further comprising:
- causing an operation associated with the graphical user interface to be executed in response to the touch-sensitive display screen receiving the electrical signal representing the simultaneous physical touch of the first plurality of touch sensors of the touch-sensitive component on the back portion of the client device.

18. The system of claim 16, wherein the touch-sensitive component on the back portion of the client device is electrically coupled to the touch-sensitive display screen of the front portion of the client device, wherein a first group of multiple touch sensors on the touch-sensitive component on the back portion of the client device is associated with a first conductive element of the touch-sensitive display screen, and wherein a second group of multiple touch sensors on the touch-sensitive component on the back portion of the client device is associated with a second conductive element of the touch-sensitive display screen.

19. The system of claim 16, the operations further comprising scrolling a display of a web browser in a direction corresponding to a swipe gesture.

20. A non-transitory machine-readable storage medium that includes instructions that, when executed by one or more processors of a machine, cause the machine to perform operations comprising:
- storing a many-to-one correspondence between a first plurality of touch sensors of a touch sensitive component on a back portion of a client device and a first capacitor on a touch-sensitive display screen of a front portion of the client device; and
- in response to detecting simultaneous physical touch of the first plurality of touch sensors, transmitting an electrical signal representing the simultaneous physical touch to the first capacitor, the first capacitor comprising a conductive element of a plurality of conductive elements associated with the touch-sensitive display screen of the front portion of the client device.

* * * * *